United States Patent
Kemp

(10) Patent No.: US 10,338,532 B2
(45) Date of Patent: Jul. 2, 2019

(54) TRIGONOMETRIC DISPLAY AND METHOD THEREOF

(71) Applicant: L. Franklin Kemp, Plano, TX (US)

(72) Inventor: L. Franklin Kemp, Plano, TX (US)

( * ) Notice: Subject to any disclaimer, the term of this patent is extended or adjusted under 35 U.S.C. 154(b) by 0 days.

(21) Appl. No.: 16/160,055

(22) Filed: Oct. 15, 2018

(65) Prior Publication Data

US 2019/0129361 A1 May 2, 2019

Related U.S. Application Data

(60) Provisional application No. 62/578,989, filed on Oct. 30, 2017.

(51) Int. Cl.
| | |
|---|---|
| *G04B 19/04* | (2006.01) |
| *G04B 19/08* | (2006.01) |
| *G04B 45/00* | (2006.01) |
| *G09B 23/04* | (2006.01) |
| *G09B 23/00* | (2006.01) |
| *G09B 23/02* | (2006.01) |

(52) U.S. Cl.
CPC ......... *G04B 19/048* (2013.01); *G04B 19/082* (2013.01); *G04B 19/085* (2013.01); *G04B 19/087* (2013.01); *G04B 45/00* (2013.01); *G04B 45/003* (2013.01); *G04B 45/0023* (2013.01); *G09B 23/04* (2013.01); *G04B 45/0038* (2013.01); *G09B 23/00* (2013.01); *G09B 23/02* (2013.01)

(58) Field of Classification Search
CPC .. G04B 19/048; G04B 19/082; G04B 19/085; G04B 45/00; G04B 45/0023; G04B 45/003; G04B 45/0038; G09B 23/00; G09B 23/02; G09B 23/04
See application file for complete search history.

(56) References Cited

U.S. PATENT DOCUMENTS

| | | |
|---|---|---|
| D30,053 S | 1/1899 | Haupt |
| D81,038 S | 4/1930 | Wynn |
| D103,567 S | 3/1937 | Fisher |
| 2,173,519 A | 9/1939 | David et al. |
| 2,434,250 A | 1/1948 | Carl et al. |
| D172,582 S | 7/1954 | Darrot |
| D172,992 S | 9/1954 | Schwankhaus |
| 2,694,285 A | 11/1954 | Hickey et al. |

(Continued)

FOREIGN PATENT DOCUMENTS

CH 703232 B1 * 12/2011 ........... G04B 19/202

OTHER PUBLICATIONS

Unit Circle Radian Wall Clock, published on Feb. 18, 2013, full document (Year: 2013).*

(Continued)

*Primary Examiner* — Daniel P Wicklund

(57) ABSTRACT

A trigonometric function display clock includes a clock face that has a center aligned with a central axis, axial markings aligned with an x-axis and a y-axis, and a secondary circle having a diameter equal to a radius of the axial markings. A first point on the secondary circle is aligned at the center of the central axis, and the secondary circle is configured to be rotatable about the first point. The secondary circle is configured to overlap and align with at least a portion of the axial markings as the secondary circle rotates about the first point.

18 Claims, 7 Drawing Sheets

(56) References Cited

U.S. PATENT DOCUMENTS

| | | | |
|---|---|---|---|
| D181,620 S | 12/1957 | Bloch | |
| D197,912 S | 4/1964 | Rodd | |
| 3,556,397 A | 1/1971 | Andersen et al. | |
| 3,570,239 A | 3/1971 | Charles et al. | |
| 3,595,009 A | 7/1971 | Pakter et al. | |
| 3,826,021 A * | 7/1974 | De Andrea | G09B 23/04 235/61 GM |
| 4,421,421 A | 12/1983 | Bradt | |
| 4,435,162 A * | 3/1984 | Schoenwald | G09B 23/04 434/215 |
| 4,655,714 A * | 4/1987 | Djali | G09B 23/04 235/61 GM |
| D312,793 S | 12/1990 | Fujiwara | |
| D377,762 S | 2/1997 | Chien | |
| D409,098 S | 5/1999 | Michaeli | |
| D411,114 S | 6/1999 | Mei et al. | |
| D413,272 S | 8/1999 | Duke | |
| D417,398 S | 12/1999 | Fernekes et al. | |
| 6,132,217 A * | 10/2000 | Dickson | G09B 23/04 434/211 |
| 6,310,836 B1 | 10/2001 | Fujii et al. | |
| 6,809,992 B1 * | 10/2004 | Ermel | G04B 19/08 368/228 |
| 6,813,222 B1 * | 11/2004 | De Salivet De Fouchecour | G04B 19/04 368/228 |
| D577,296 S | 9/2008 | Manning | |
| D580,808 S | 11/2008 | Van Tulder | |
| D665,690 S | 8/2012 | Bode | |
| 8,379,491 B2 * | 2/2013 | Bonhoff | G04C 17/005 368/223 |
| 8,432,772 B2 | 4/2013 | Meis | |
| D686,933 S | 7/2013 | Garzon | |
| D766,766 S | 9/2016 | Lasserre | |
| D781,720 S | 3/2017 | Duport | |
| D809,413 S | 2/2018 | Prince et al. | |
| D810,602 S | 2/2018 | Bode | |
| D812,509 S | 3/2018 | Tonohori | |
| D815,971 S | 4/2018 | Goldstein | |
| D824,793 S | 8/2018 | Kociszewski | |
| 2007/0014194 A1 | 1/2007 | Yang et al. | |

OTHER PUBLICATIONS

Notice of Allowance dated Mar. 11, 2019, US Design Application No. 29/624,167, filed on Oct. 30, 2017.

Trigonometric set | posted at cidepe.com.br no date [online].© 2019 [retrieved Feb. 20, 2019] from Internet: <https://www.cidepe.com.br/index.php/en/produtos-interna/trigonometric-set-2024>(Year 2019).

* cited by examiner

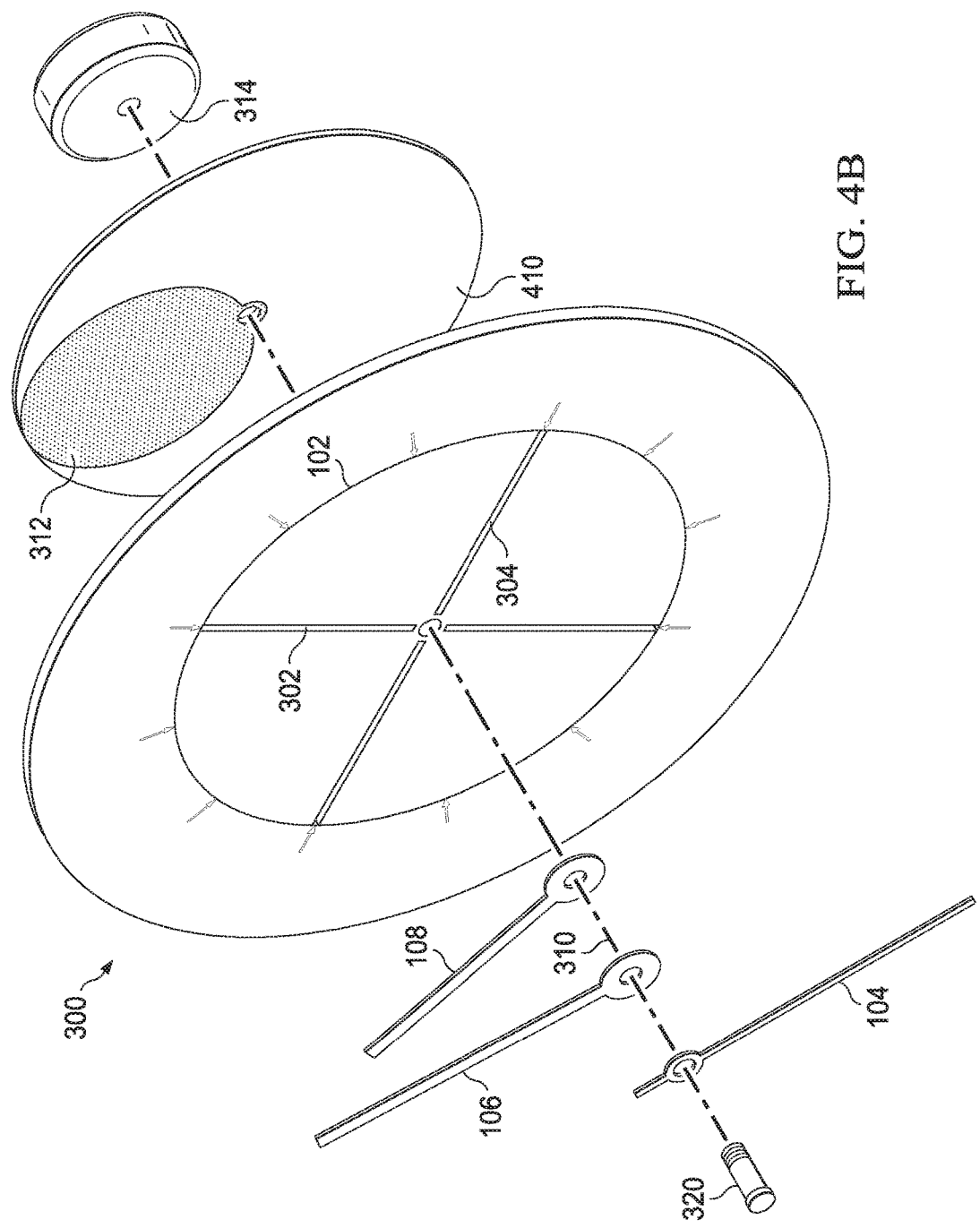

TRIGONOMETRIC DISPLAY AND METHOD THEREOF

CROSS-REFERENCE TO RELATED APPLICATIONS

This application claims priority to U.S. Provisional Patent Application No. 62/578,989 filed on Oct. 30, 3017 and entitled "Trigonometric Display and Method Thereof," which is incorporated herein in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mathematical functions are universally used in a variety of industries. In order to understand various mathematical functions, a variety of visualizations can be performed. For example, triangles and other shapes are used to depict trigonometric functions. While these visualizations are useful, additional ways of depicting such functions may help communicate the information.

SUMMARY

In an embodiment, a trigonometric function display clock comprises a unit circle disposed on a clock face that has a center of the unit circle aligned with a central axis, axial markings aligned with an x-axis and a y-axis, and a secondary circle having a diameter equal to a radius of the unit circle. A first point on the secondary circle is aligned at the center of the unit circle, and the secondary circle is configured to be rotatable about the first point. The secondary circle is configured to overlap and align with at least a portion of the axial markings as the secondary circle rotates about the first point. The clock can have at least one hand configured to rotate about the central axis, and the at least one hand can be an hour hand, a minute hand, and a second hand. The secondary circle can be coupled to the at least one hand. The secondary circle can be disposed within the unit circle, and a second point on the secondary circle can align with the unit circle.

In an embodiment, a trigonometric function display clock comprises a unit circle disposed on a clock face, where a center of the unit circle is aligned with a central axis, axial openings in the clock face that are aligned with an x-axis and a y-axis, and a secondary circular disc having a diameter equal to a radius of the unit circle. A first point on the secondary circular disc is aligned at the center of the unit circle, and the secondary circular disc can be configured to be rotatable about the first point. The secondary circular disc can be disposed on a first side of the clock face. The secondary circular disc can be visible through the axial openings from a second side of the clock face. The clock can also include at least one hand configured to rotate about the central axis, and the at least one hand can be disposed on the second side of the clock face. The secondary circular disc can be coupled to the at least one hand, and the at least one hand can comprise an hour hand, a minute hand, and a second hand. A second point on a perimeter of the secondary circular disc can align with the unit circle.

In an embodiment, a method of displaying one or more trigonometric functions comprises: providing a display device comprising a unit circle disposed on a clock face, wherein a center of the unit circle is aligned with a central axis, axial markings aligned with an x-axis and a y-axis, and a secondary circle having a diameter equal to a radius of the unit circle. A first point on the secondary circle is aligned at the center of the unit circle, and a second point on a perimeter of the secondary circle aligns with the unit circle. The method can also include rotating the secondary circle about the first point, where the secondary circle intersects with at least a portion of the axial markings as the secondary circle rotates about the first point, and determining at least one of a value of a sine function or a value of a cosine function at the second point based on the overlap between the secondary circle and the axial markings. Determining the at least one of the value of the sine function or the cosine function at the second point can comprise determining a value of the cosine function at the second point, where the value of the cosine function corresponds to a proportional length of: 1) a first length of the axial marking between the central axis and an intersection between the secondary circle and the axial marking on the x-axis, and 2) a total length between the central axis and the unit circle along the axial marking on the x-axis. Determining the at least one of the value of the sine function or the cosine function at the second point can comprise determining a value of the sine function at the second point, where the value of the sine function corresponds to a proportional length of: 1) a first length of the axial marking between the central axis and an intersection between the secondary circle and the axial marking on the y-axis, and 2) a total length between the central axis and the unit circle along the axial marking on the y-axis.

In some embodiments, the axial markings comprise openings in the clock face, and the secondary circle comprises a perimeter of a secondary circular disc. The secondary circular disc can be disposed on a first side of the clock face, and the secondary circular disc is visible through the openings from a second side of the clock face. In these embodiments, determining the at least one of the value of the sine function or the cosine function at the second point can comprise determining a value of the cosine function at the second point, where the value of the cosine function corresponds to a proportional length of: 1) a first length of the secondary circular disc between the central axis and the unit circle visible through the opening on the x-axis, and 2) a total length between the central axis and the unit circle along the opening on the x-axis. Similarly, determining the at least one of the value of the sine function or the cosine function at the second point can comprise determining a value of the sine function at the second point, where the value of the sine function corresponds to a proportional length of: 1) a first length of the secondary circular disc between the central axis and the unit circle visible through the opening on the y-axis, and 2) a total length between the central axis and the unit circle along the opening on the y-axis. The display device can also include at least one hand configured to rotate about the central axis, and the at least one hand can be an hour hand, a minute hand, and a second hand. The secondary circle can be coupled to the at least one hand. The method can also include determining a time using the at least one hand on the display device. The display device can also include an enclosing square displayed around the unit circle, and the method can also include determining at least one of a tangent value or a cotangent value at the second point using the enclosing square.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4B illustrates an exploded view of another embodiment of the clock face shown in FIG. 3.

DETAILED DESCRIPTION

Figure 1:
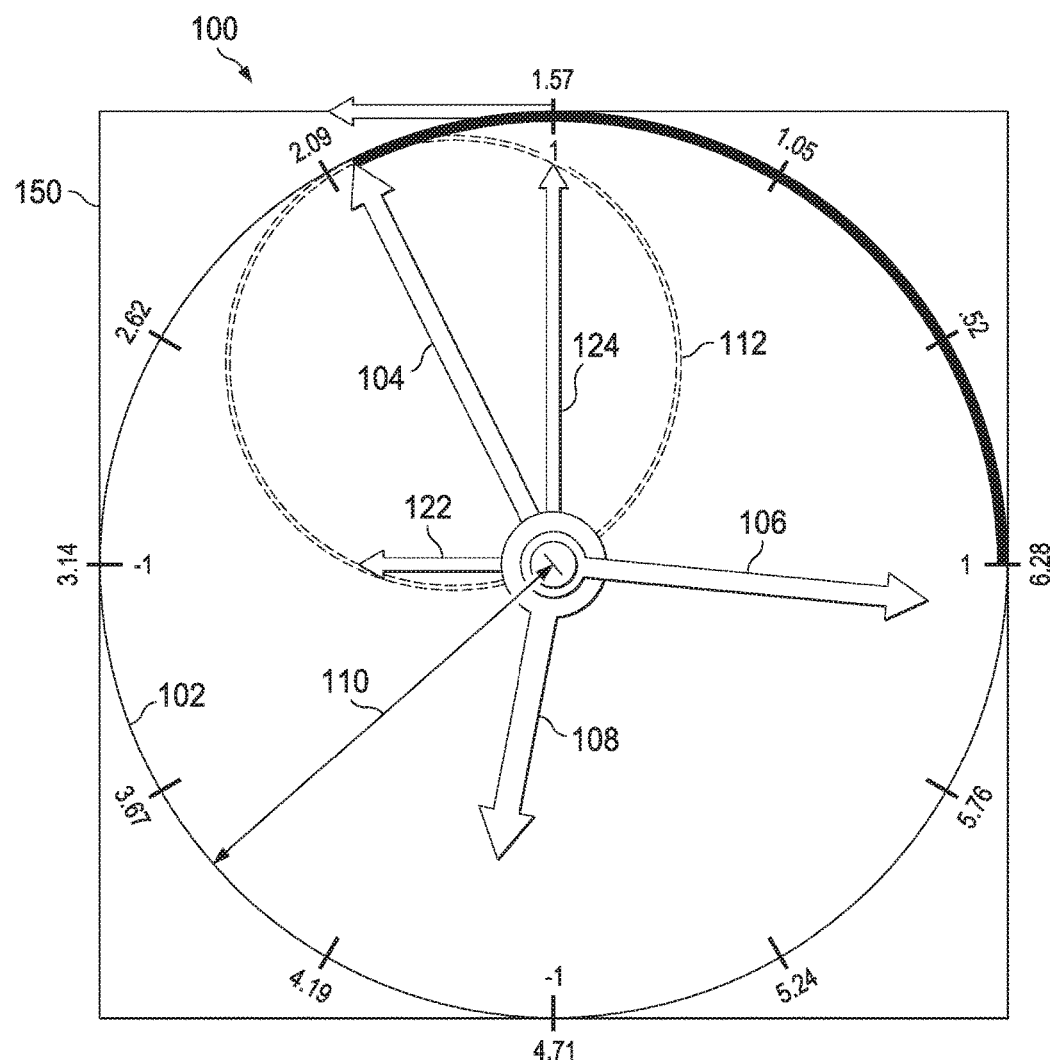
FIG. 1 schematically illustrates a clock face according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in an embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed herein is a display that allows various trigonometric functions to be visualized. The display can be used as a teaching tool or decorative display. In some instances, the display can be combined with a clock face so that the resulting device can serve as both a clock and a visual indicator of the trigonometric functions.

As an example of a display, a clock can comprise the various hands such as the hour hand, the minute hand, and optionally, the second hand. A first circle can be created around and centered on the rotational axis of the time hands, where the first circle can have a first diameter. The first circle can generally be stationary and would be placed at or near a perimeter of the clock face. A second circle can then be placed so that an edge of the second circle is aligned along and rotates about the axis of rotation of the time hands. The second circle can have a diameter that is exactly half that of the first circle. The second circle can rotate with the time hands about the axis of rotation of the time hands, and an outer diameter of the second circle can then align with the first circle. Two perpendicular cross lines can be created on the face of the display. As the second circle rotates about the axis of the time hands, the second circle will intersect with the cross lines, thereby creating a line that represents a value or magnitude of one or more trigonometric functions, as described in more detail herein. Thus, the proposed displays can be used to visualize various functions while in some instances also serving as a time piece.

In an embodiment, a clock face can be used to visually display various trigonometric functions. As shown in FIG. 1, the clock face 100 can include a unit circle 102 and a plurality of time hands including an hour hand 108, a minute hand 106, and a second hand 104. In some instances less than all of the hands may be present. The unit circle 102 can be used on or for the clock face 100. A secondary circle 112 can be aligned with at least one of the hands, where the secondary circle 112 has a point aligned with the center of the hands. For example, the hands can be seen to rotate about an axis extending normal to the plane of the clock face 100 in FIG. 1. The secondary circle 112 can also rotate about this axis such that an outer point on the secondary circle 112 moves along the unit circle 102. Angular labels can optionally be included to mark the positions along the unit circle 102. For example, the angular positions can be labeled in radians, and these positions can be labeled along with or in place of the hour markings normally found on a clock.

As clock hands 104, 106, 108 rotate, they define angles that can be seen as distances along the edge of the unit circle 102 from a base position (e.g., a zero or $2\pi$ position). As shown in FIG. 1, the 3 o'clock position can be a base position, and the angles can be positive if counter-clockwise or negative if clockwise, though the angles can be defined in opposite directions as well. The unit circle 102 can have a radius 110. In an embodiment, the radius 110 of the unit circle 102 can be defined, for example, by the length of the second hand 104 (generally taken as the longest hand having a length that is greater than the hour hand 108 and the minute hand 106). In this example, attaching a secondary circle 112 to the second hand 104 whose diameter is the same length as the second hand 104 yields the cosine value of the second hand 104 angle as the secondary circle 112 intersects the x axis and the sine value of the second hand 104 angle as the secondary circle 112 intersects the y-axis. The cosine value is the signed distance from the origin to the x intersection point along the x-axis, yielding values between −1 and 1.

Similarly, the sine value is the signed distance from the origin to the y intersection point along the y-axis, yielding values between −1 and 1. Thus, the use of the unit circle 102 with the secondary circle 112 allows various mathematical functions to be displayed.

While described in terms of the second hand 104, any of the hands 104, 106, 108 can be used with the secondary circle 112. In some embodiments, the lengths of the hands 104, 106, 108 may be modified from their usual lengths in order to allow for placement of the secondary circle 112 on a hand other than the second hand. For example, the hour hand 108 and/or the minute hand 106 can be lengthened, and the seconds hand can optionally be shortened, to allow for use of the secondary circle 112 with the hour hand 108 and/or the minute hand 106.

The clock face 100 illustrates that any vector (e.g., as illustrated by one of the hands of the clock) can be represented as the sum of two orthogonal arrows or vectors. The dynamic movement of the second hand emphasizes how cosine and sine are parameterized by arc length. Labelling arc length with numbers rather than fractions of $\pi$ may help to enforce the meaning of $\pi$ being equal to approximately 3.1416 as the scale factor times a radius to get the length of a semicircle (or times a diameter to get a full circle). The breakdown of the two vectors can be taken as a visual estimate of the cosine and sine functions of arc length.

The clock display 100 can be created using a variety of technologies. As shown in FIG. 1, the clock face 100 can be created by a processor executing an application stored in a memory, where the computer implementation components are described in more detail herein. The application can create the display of the clock 100, the hands 104, 106, 108, the unit circle 102, and the secondary circle 112. When created as a computer display, functional indicators such as the cosine indicator 122 and the sine indicator 124 can be provided to graphically illustrate the value of the resulting sine or cosine functions. In these embodiments, the unit circle 102 and the secondary circle 112 are optional as they indicators 122, 124 can be displayed graphically without the need for the intersection of the unit circle 102 and the secondary circle 112. Further, the hands can comprise different colors to make the distinction between the clock hands in the display clearer.

The cosine indicator 122 can provide an indication of the cosine value corresponding to the intersection of the secondary circle 112 with the x-axis. The value of the cosine indicator can range between −1 to 1, where a zero line length corresponds to a value of zero. A line length between the center and the positive intersection at the unit circle 102 (e.g., the 3 O'clock position) can be defined to have a value of 1, and a line length between the center and the negative intersection at the unit circle 102 (e.g., the 9 O'clock position) can be defined to have a value of −1. Similarly, the sine indicator 124 can provide an indication of the sine value corresponding to the intersection of the secondary circle 112 with the y-axis. The value of the sine indicator can range between −1 to 1, where a zero line length corresponds to a value of zero. A line length between the center and the positive intersection at the unit circle 102 (e.g., the 12 O'clock position) can be defined to have a value of 1, and a line length between the center and the negative intersection at the unit circle 102 (e.g., the 6 O'clock position) can be defined to have a value of −1. The functional indicators can dynamically change as the secondary circle 112 rotates around the clock face.

Figure 2:
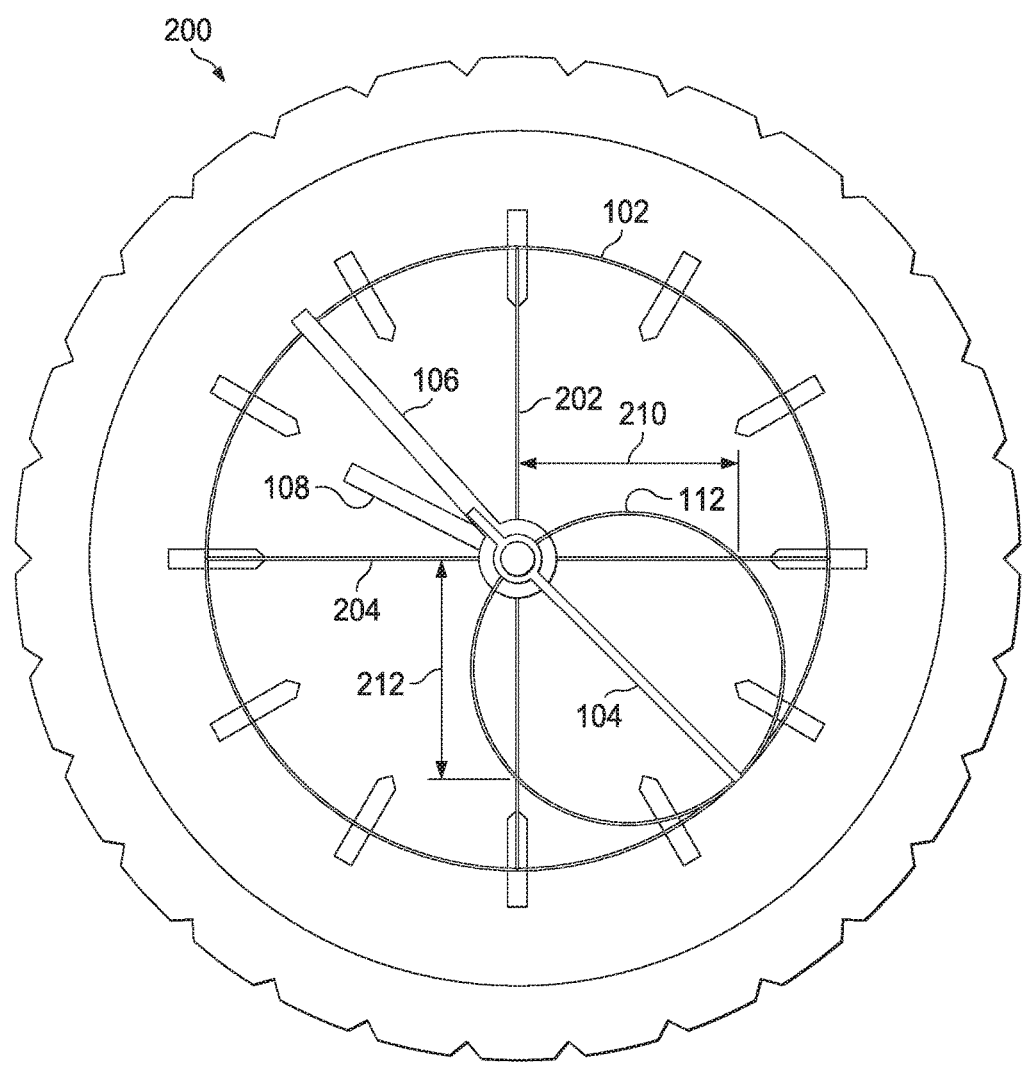
FIG. 2 illustrates a front elevation view of a clock face according to an embodiment.

The clock display can also be created using a mechanical clock. As shown in FIG. 2, a mechanical clock face 200 can include the unit circle 102 and the plurality of time hands including an hour hand 108, a minute hand 106, and a second hand 104. The unit circle 102 can be used on or for the clock face 200. A secondary circle 112 can be aligned with at least one of the hands, where the secondary circle 112 has a point aligned with the center of the hands. Thus, the main components of the clock face 200 are generally similar to those presented in FIG. 1, and similarly numbered elements can be the same or similar to those described with respect to FIG. 1.

The mechanical clock face 200 can generally have a motor or other mechanism coupled to the hands 104, 106, 108 to create rotation about the central axis over time. The clock face 200 can comprise a relatively planar sheet located between the motor and the hands 104, 106, 108, where the drive shafts extend through the clock face 200 and define the rotational axis of the hands 104, 106, 108. In this configuration, the motor would reside on the opposite side of the clock face 200 from the hands 104, 106, 108.

The unit circle 102 can comprise a circular marking or device attached to the clock face 200. For example, the unit circle 102 can be painted or printed on the clock face 200 and/or a material such as disk or tube of material (e.g., plastic, metal, glass, paper, etc.) can be attached to the clock face 200 to form the unit circle 102. In the example shown in FIG. 2, a secondary circle 112 can be attached to the second hand 104, where the secondary circle 112 has a diameter equal to a radius of the unit circle 102. An edge of the secondary circle 112 can be aligned with the axis of rotation of the second hand 104 such that rotation of the second hand aligns an outer point of the secondary circle 112 with the unit circle 102. The secondary circle 112 can be formed of a ring of material (e.g., metal, plastic, glass, paper, etc.) that is attached to the second hand 104.

In addition to the unit circle 102 and the secondary circle 112, axial markings 202, 204 representing the y-axis and the x-axis, respectively, can be attached to the clock face 200. The axial markings 202, 204 can be formed in the same manner as or similarly to the unit circle 102 on the clock face 200. In use, the secondary circle 112 and the axial markings 202, 204 function to display the cosine and sine functions at the intersection of the axial markings 202, 204 with the secondary circle 112. For example, the cosine can be displayed by providing an indication of the cosine value corresponding to a length 210 of the axial marking 204 between the rotational axis and the intersection of the secondary circle 112 with the axial marking 204 for the x-axis. The value of the cosine can range between −1 to 1, where a zero length of the axial marking 204 within the secondary circle 112 corresponds to a value of zero for the cosine. A length of the axial marking 204 within the secondary circle 112 between the center and the positive intersection at the unit circle 102 (e.g., the 3 O'clock position) can be defined to have a value of 1, and a length of the axial marking 204 within the secondary circle 112 between the center and the negative intersection at the unit circle 102 (e.g., the 9 O'clock position) can be defined to have a value of −1. As shown in FIG. 2, the value of the cosine is illustrated by the relative amount of the axial marking 204 within the secondary circle 112 between the rotational axis towards the 3 O'clock position.

Similarly, the sine can be displayed by providing an indication of the sine value corresponding to a length 212 of the axial marking 202 for the y-axis between the rotational axis and the intersection of the secondary circle 112 with the axial marking 202 for the y-axis. The value of the sine can range between −1 to 1, where a zero length of the axial marking 202 within the secondary circle 112 corresponds to a value of zero for the sine. A length of the axial marking 202 within the secondary circle 112 between the center and the positive intersection at the unit circle 102 (e.g., the 12 O'clock position) can be defined to have a value of 1, and a length of the axial marking 202 within the secondary circle 112 between the center and the negative intersection at the unit circle 102 (e.g., the 6 O'clock position) can be defined to have a value of −1. As shown in FIG. 2, the value of the sine is illustrated by the relative amount of the axial marking 202 within the secondary circle 112 between the rotational axis towards the 6 O'clock position.

As shown in the embodiment of FIG. 2, the display clock 200 can include one or more hands 104, 106, 108 to illustrate time, a unit circle 102 encircling the hands, axial markings for the x-axis 204 and the y-axis 202, and a secondary circle 112 having a diameter equal to a radius of the unit circle 102. The secondary circle 112 can have a first point on the circle aligned at the center point of the unit circle 102, and the secondary circle 112 can be arranged to rotate about the first point. In this arrangement, an outer point on the secondary circle 112 aligns with a point on the unit circle 102. The sine and cosine functions can then be displayed based on an intersection of the unit circle with the markings for the x-axis 204 and the y-axis 202. When used on a clock face 200, the secondary circle 112 can be coupled to one of the hands 104, 106, 108 to rotate about the center point during use of the clock, thereby serving both to illustrate the time as well as the trigonometric functions of at least sine and cosine.

Figure 3:
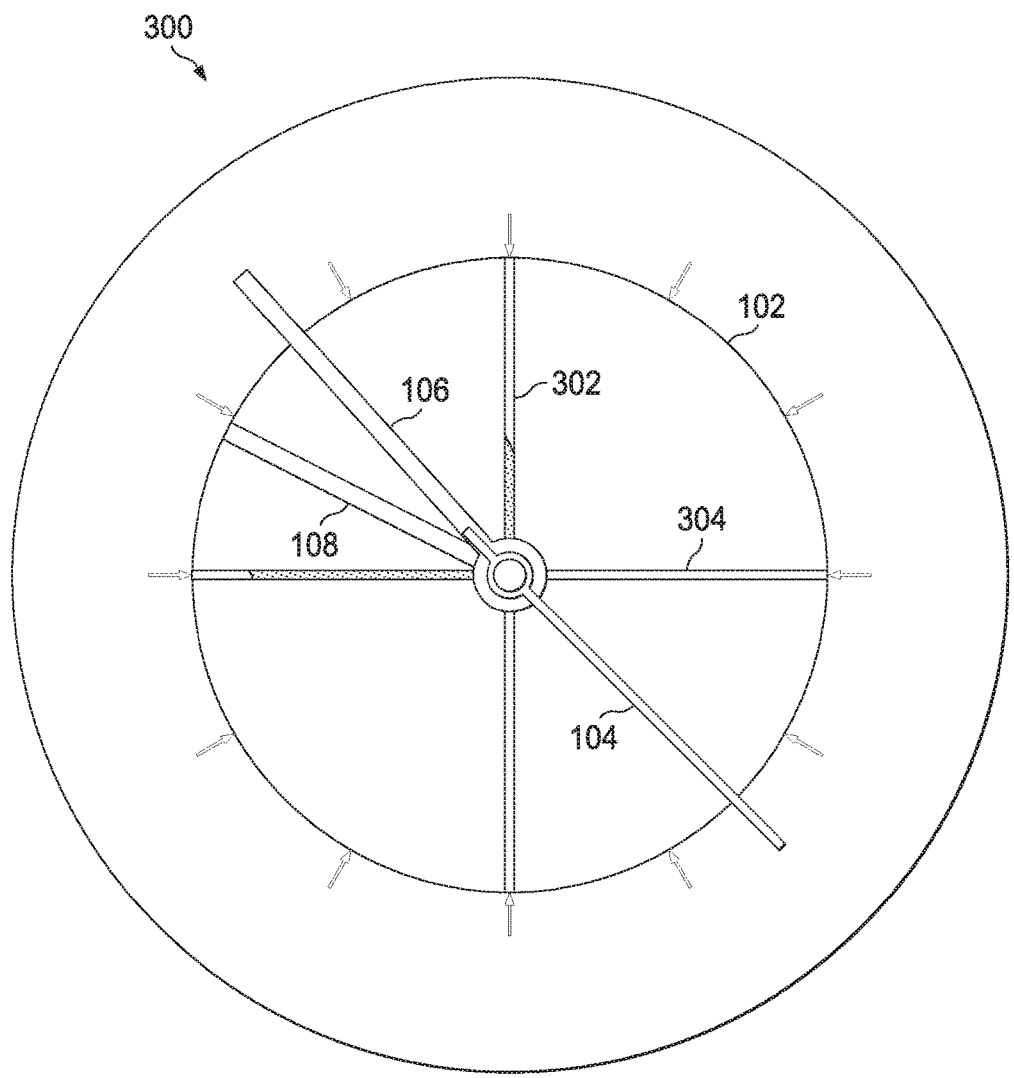
FIG. 3 illustrates a front elevation view of another clock face according to another embodiment.
Figure 4A:
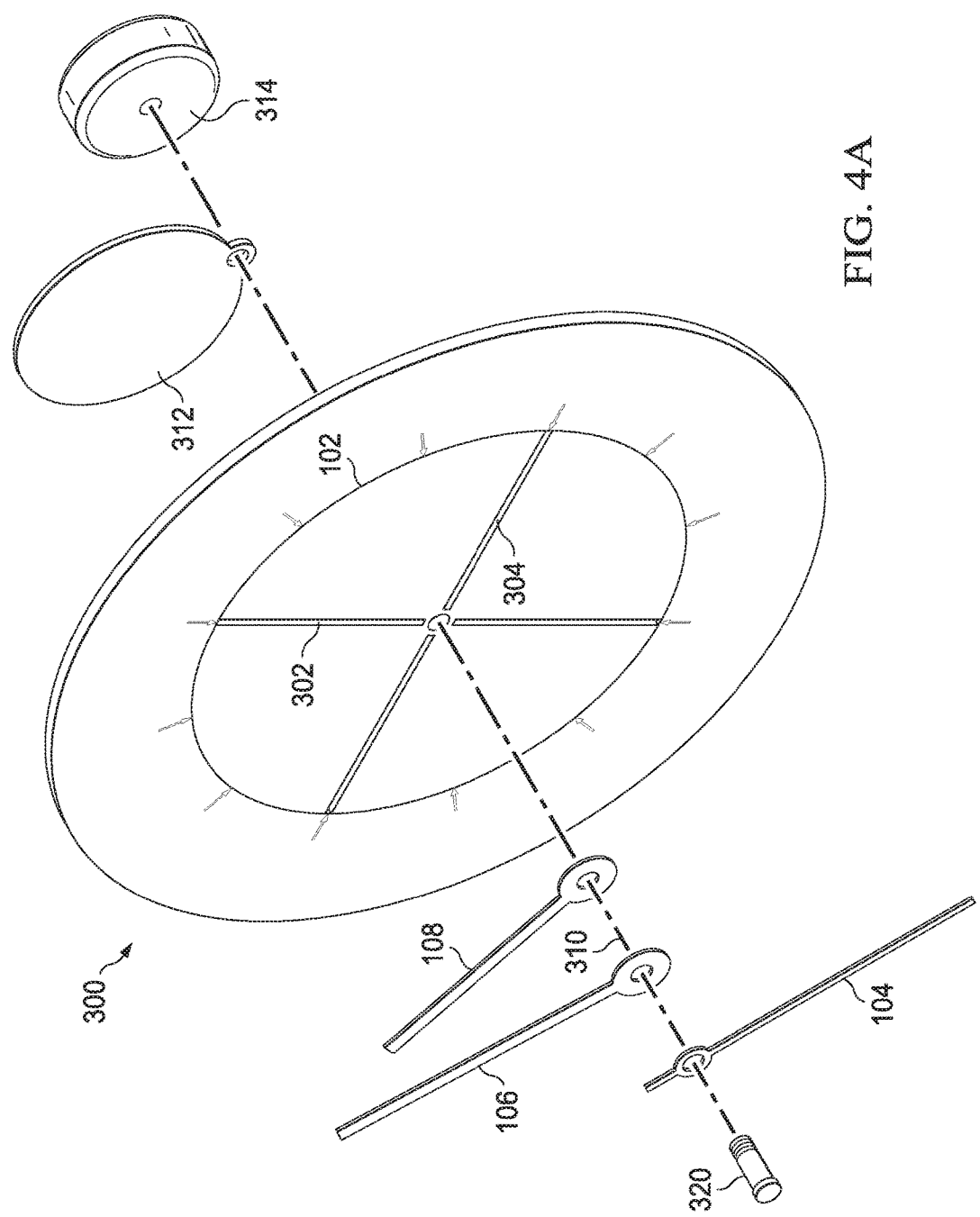
FIG. 4A illustrates an exploded view of an embodiment of the clock face shown in FIG. 3.

An alternative embodiment of a mechanical clock face is shown in FIGS. 3 and 4A-4B, where FIG. 3 is a perspective view of the face of the clock while FIGS. 4A-4B are exploded views of embodiments of the same clock. As shown in FIGS. 3 and 4A-4B, a mechanical clock face 300 can include the unit circle 102 and the plurality of time hands including an hour hand 108, a minute hand 106, and a second hand 104. The unit circle 102 can be used on or for the clock face. In the embodiment of FIGS. 3 and 4A-4B, the secondary circle is in the form of a secondary circular disc 312 that can be aligned with at least one of the hands, where an outer diameter of the secondary circular disc 312 forms the secondary circle and has a point aligned with the center of the hands. Thus, the main components of the clock face 300 are generally similar to those presented in FIGS. 1 and 2, and similarly numbered elements can be the same or similar to those described with respect to FIGS. 1 and 2.

The mechanical clock face 300 can generally have a motor 314 or other mechanism coupled to the hands 104, 106, 108 to create rotation about the central axis 310 over time. The clock face 300 can comprise a relatively planar sheet located between the motor and the hands 104, 106, 108, where the drive shafts 320 extend through the clock face 300 and define the rotational axis of the hands 104, 106, 108. In this configuration, the motor 314 would reside on the opposite side of the clock face 300 from the hands 104, 106, 108.

In this configuration, the clock face 300 can comprise axial markings in the form of slits or openings 302, 304 in the clock face 300 that extend between the central axis 310 and the unit circle 102. In this configuration, the clock face can support itself around the edge of the openings 302, 304, for example, by being formed from a rigid material like metal or plastic. The clock drive shaft can be anchored by the motor and a motor plate which attaches to the clock face. In some embodiments, a portion of the clock face 300 may not be removed at or near the central axis to provide stability to the clock face during use. The openings 302, 304 allow for the secondary circular disc 312 disposed behind the clock face 300 to be viewed from the front of the clock face 300.

In the example shown in FIGS. 3 and 4A, the secondary circular disc 312 can be attached to the gearing for one of the hands such as the hour hand 108, where the secondary circular disc 312 has a diameter equal to a radius of the unit circle 102. While described herein as being used with the hour hand 108, the secondary circular disc 312 can be used with any of the hands 104, 106, 108, or any other suitable indicator. An edge of the secondary circular disc 312 can be aligned with the axis of rotation of the hour hand 108 such that rotation of the hour hand 108 aligns an outer point of the secondary circular disc 312 substantially with the unit circle 102, though positioned on the opposite side of the clock face from the unit circle 102. The secondary circular disc 312 can be formed of a disc of material (e.g., metal, plastic, glass, paper, etc.). While not shown, a background having a different color than the secondary circular disc 312 can be present behind the secondary circular disc 312 such that a contrasting color can allow the secondary circular disc 312 to be easily viewed through the openings 302, 304. In this arrangement, the secondary circular disc 312 can function as the sine or cosine indicator.

While shown as having the hands 104, 106, 108 on a side of the clock face 300, the clock face can, in some embodiments, be formed with at least a portion having a transparent material. For example, the outer ring past the unit circle 102 as shown in FIG. 4A can be transparent. One or more of the hands 104, 106, 108 can then be placed behind the clock face and show through the transparent portion. In these embodiments, the unit circle 102 may be opaque, and only the portion of the hand 104, 106, 108 that extends beyond the unit circle 102 may be visible. In some embodiments, a second backing may be present between the clock face and the motor 314 so that only the hands between the clock face and the backing can be seen, which allows the second backing to conceal the motor and frame.

As shown in FIG. 4B, the secondary circular disc 312 can be disposed on a background disc 410 that can be symmetric about the central axis 310. In this embodiment, the secondary circular disc 312 can be attached to or disposed on the background disc 410. For example, the secondary circular disc 312 can be printed on the background disc 410. In this embodiment, the background disc 410 can have a radius that is equal to or greater than the radius of the openings 302, 304 such that the background disc 410 is visible through the openings. The background disc 410 can then have the same color as the clock face so that the openings would appear to only show the color of the secondary circular disc 312 through the openings as the background disc 410 and the clock face otherwise match. When the background disc 410 is symmetric about the central axis 310, the gearing of the clock may be less prone to unbalanced forces causing difficulties with the gearing and/or inaccuracies with keeping time. The background disc 410 can be coupled to and rotate with one of the hands 104, 106, 108. For example, the background disc 410 can be coupled to and rotate with the hour hand 108 in some embodiments.

The clock display as shown in FIGS. 3 and 4A-4B can function similarly to the clock display described with respect to FIG. 2. For example, the cosine can be displayed by providing an indication of the cosine value corresponding to a length of the secondary circular disc 312 visible through the opening 304 for the x-axis, which corresponds to a length of the secondary circular disc 312 between the rotational axis and the intersection of the secondary circular disc 312 with the opening 304 for the x-axis. The value of the cosine can range between −1 to 1, where a zero length of the secondary circular disc 312 visible within the opening 304 corresponding to a value of zero for the cosine. A length of the secondary circular disc 312 visible within the opening 304 between the center and the positive intersection of the opening 304 at the unit circle 102 (e.g., the 3 O'clock position) can be defined to have a value of 1, and a length of the secondary circular disc 312 visible within the opening 304 between the center and the negative intersection of the opening 304 at the unit circle 102 (e.g., the 9 O'clock position) can be defined to have a value of −1. As shown in FIG. 3, the value of the cosine is illustrated by the relative amount of the secondary circular disc 312 visible within the opening 304 between the rotational axis towards the 3 O'clock position.

Similarly, the sine can be displayed by providing an indication of the sine value corresponding to a length of the secondary circular disc 312 visible through the opening 302 for the y-axis, which corresponds to a length of the secondary circular disc 312 visible between the rotational axis and the intersection of the secondary circular disc 312 with the opening 302 for the y-axis. The value of the sine can range between −1 to 1, where a zero length of the secondary circular disc 312 visible within the opening 302 corresponding to a value of zero for the sine. A length of the secondary circular disc 312 visible within the opening 302 between the center and the positive intersection of the opening 302 at the unit circle 102 (e.g., the 12 O'clock position) can be defined to have a value of 1, and a length of the secondary circular disc 312 visible within the opening 302 between the center and the negative intersection of the opening 302 at the unit circle 102 (e.g., the 6 O'clock position) can be defined to have a value of −1. As shown in FIG. 3, the value of the sine is illustrated by the relative amount of the secondary circular disc 312 visible within the opening 302 between the rotational axis towards the 6 O'clock position.

As shown in the embodiment of FIGS. 3 and 4A-4B, the display clock can include one or more hands to illustrate time, a unit circle encircling the hands, axial openings through a clock face aligned with the x-axis and the y-axis, and a secondary circular disc having a diameter equal to a radius of the unit circle. The secondary circular disc can have a first point on a perimeter of the secondary circular disc aligned at the center point of the unit circle, and the secondary circular disc can be arranged to rotate about the first point. In this arrangement, an outer point on the secondary circular disc aligns with a point on the unit circle. The sine and cosine functions can then be displayed based on an amount of the secondary circular disc visible through the axial openings for the x-axis and the y-axis. When used on a clock face, the secondary circular disc can be coupled to one of the hands behind the clock face to rotate about the center point during use of the clock, such that the clock can serve both to illustrate the time as well as the trigonometric functions of at least sine and cosine.

Other trigonometric functions can also be shown using the clocks as described herein. Returning to FIG. 1, tangent and cotangent values can also be displayed on any of the clocks described with respect to FIGS. 1 to 4B. In this embodiment, tangent values appear as arrows on the left and right sides of an enclosing square 150 and cotangent values as arrows on the top and bottom sides of the enclosing square 150. The square can touch (e.g., by tangent to) the unit circle 102 at the 12 O'clock, 3 O'clock, 6 O'clock, and 9 O'clock positions. Tangent values are ordinates (i.e. y-values) and cotangent values abscissae (i.e. x-values). Arrows start or end at zero. An arrow that points at zero indicates its non-zero y or x value is to be negated. Thus tangents on the left side of the square are the negative of the y coordinate value and cotangents on the bottom of the square are the negative of the x coordinate value. For example, if the hand angle is 30° or $\pi/6 \approx 0.52$ radians, then the tangent, t, is an arrow on the right side of the square from y=0 to $y=1/(3)^{1/2}=(3)^{1/2}/3=1.732/3 \approx 0.58$; so $t \approx 0.58$. If the angle is 150° or $\pi-\pi/6=5\pi/6 \approx 2.63$ radians, then the arrow runs from y=0.58 to y=0 on the left side of the square and it is the tangent t=−0.58. If the angle is 120° or $4\pi/6 \approx 2.09$ radians, then its cotangent is the arrow from x=0 to $x=-1/(3)^{1/2} \approx -0.58$; so the cotangent is $t^{-1} \approx -0.58$. If the angle is 240° or $8\pi/6 \approx 4:19$, then the cotangent is an arrow from $x=-1/(3)^{1/2}$ to x=0 with value $t^{-1} \approx 0.58$. Tangent equals cotangent at the corners of the square such that the value is 1 if at the upper right or lower left, and −1 if at the upper left or lower right.

Figure 5:
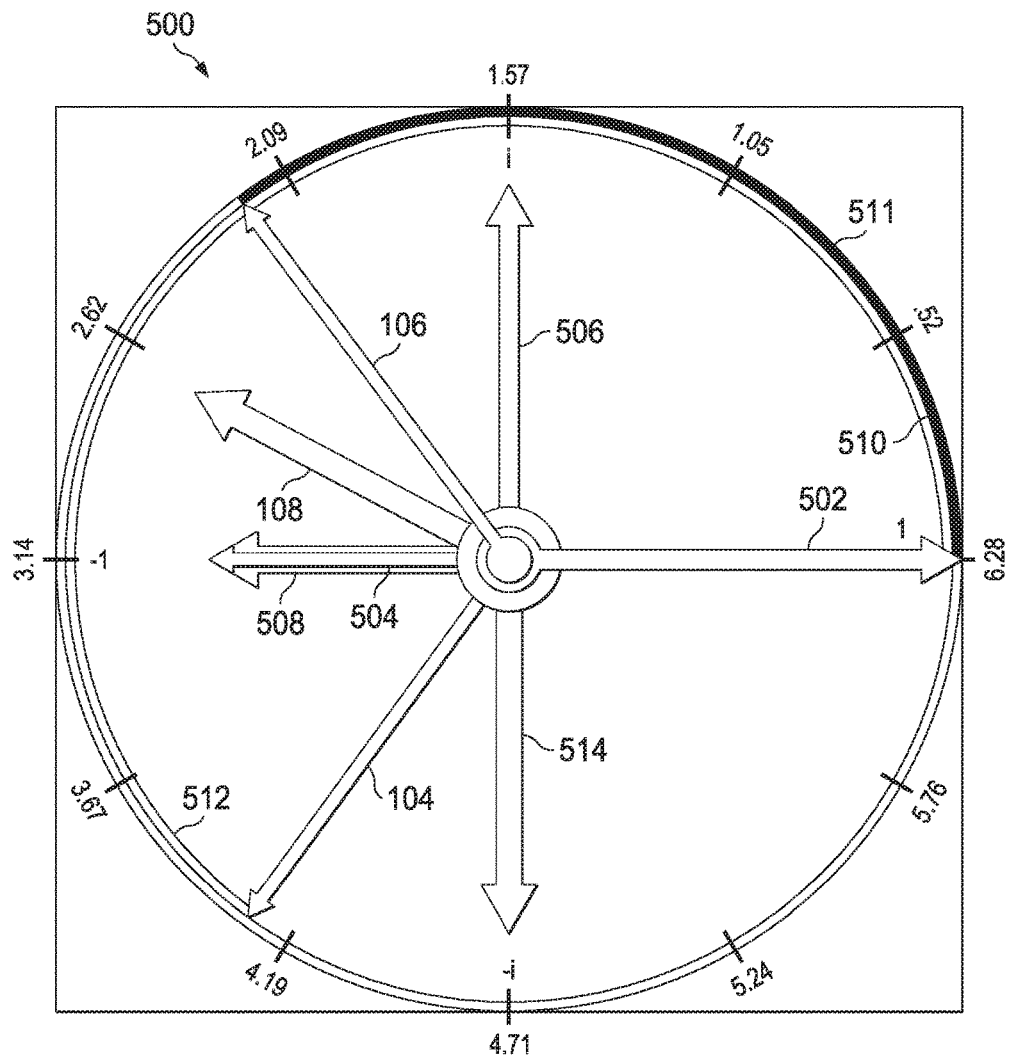
FIG. 5 schematically illustrates another clock face according to another embodiment FIG. 6 schematically illustrates a processor and associated system that can be used to provide the clock face in some embodiments.

FIG. 5 illustrates still another embodiment of the clock display in which trigonometric summations can be visually displayed. The clock face 500 is similar to that described with respect to FIGS. 1-4B except that the y-axis is labelled as imaginary so that the hands represent complex numbers. In FIG. 5, similar numbers to those appearing in FIGS. 1-4B can represent the same or similar elements as described with respect to FIGS. 1-4B. In this arrangement, the minute hand 106 and the second hand 104 can be multiplied as complex numbers to produce a third unit hand 502, which manifests the trigonometric sum identities for cosine and sine. For example, the cosine and the sine are the arc sum of the minute hand's 106 arc 510 and the second hand's 104 arc 512. The three hands 104, 106, 502 with their cosine and sine projections can produce nine hands, where a total of ten hands will appear when the hour hand 108 is included. In order to distinguish between the hands, the hands can have contrasting colors, patterns, thicknesses, or the like on the display.

Multiplications of any two resulting hands produces an additional hand whose position is the sum of the arc lengths of the two arrows. This shows that the multiplication can be reduced to a summation. Moreover, this fact shows how to display DeMoivre's roots of unity on the unit circle. DeMoivre's Theorem is equivalent to producing a unit hand or a unit arrow when multiplied by itself a number of times produces the unit arrow, namely the arrow pointing at (1,0) on the unit circle. As a result, the unit arrow is a root of unity. The arrow opposite the unit arrow when multiplied by itself can produce the unity arrow. These two arrows form a pair as the roots when there are two identical factors for multiplying. When there are three identical factors, the arrow pointing at $2\pi/3$ will become the unit arrow since multiplying it once will put it at $2\pi/3+2\pi/3$ and multiplying this arrow again will put it at $2\pi/3+2\pi/3+2\pi/3=2\pi$, which is the unit arrow. Likewise, the arrow pointing at $4\pi/3$ when multiplied two more results in the unit arrow since $4\pi/3+4\pi/3+4\pi/3=4\pi$, the unit arrow. Thus for three identical factors, the roots are the arrows pointing at $2\pi/3$, $4\pi/3$ and $6\pi/3$. This shows how to find the root arrows, that they are equally spaced around the unit circle, and that the number of distinct arrows equals the number of identical factors in the multiplication.

The clock can be used to perform a visual check of the trigonometric sum identities of the terms of the component arrows. For example, as shown in FIG. 5, the clock face shows the time at 9 O'clock and 54 minutes. The minute hand arrow 106 is at 128 degrees with the arc 511 (e.g. the dark black arc in FIG. 5) having a length of 2.23. The second hand 104 is at 36 seconds (e.g., 232 degrees) with an arc 512 having a length of 4.05. The product of the minute and second hands 106, 104 is shown as the arrow 502 is at 0 degrees (6.28 radians) with a total arc length as the sum of the minute hand arc length of 2.23 and the second hand arc length of 4.05 for a total length of 6.28 (or 360 degrees). This arc is indicated by appending the minute hand black arc 511 to the second hand arc 512 from 0.00 to 4.05 arriving at 6.28.

The sum of the arcs reflects the sum formulas of trigonometry, namely, the cosine of a sum of arcs is the difference of the hands cosines and sines (i.e., $\cos(\alpha+\beta)=\cos\alpha\cos\beta-\sin\alpha\sin\beta$) while the sine of a sum or arcs is the sum hands cosine and sine products (i.e., $\sin(\alpha+\beta)=\sin\alpha\cos\beta+\cos\alpha\sin\beta$). For the example as shown in FIG. 5, arrow 502=1=arrow 504×arrow 508−arrow 506×arrow 514, and 0=arrow 506×arrow 508+arrow 504×arrow 514, respectively. Thus, the clock provides a visual check of the trigonometric sum identities. If the second hand has an arc of 0 or 6.28, the product hand will overlay the minute hand. If the second hand has an arc of 3.14, the product hand will be opposite the minute hand. If the arc of the second hand is 1.57 or 4.71, the product will be perpendicular to the minute hand. These allow for simple visualization of the trigonometric sum formulation.

Figure 6:
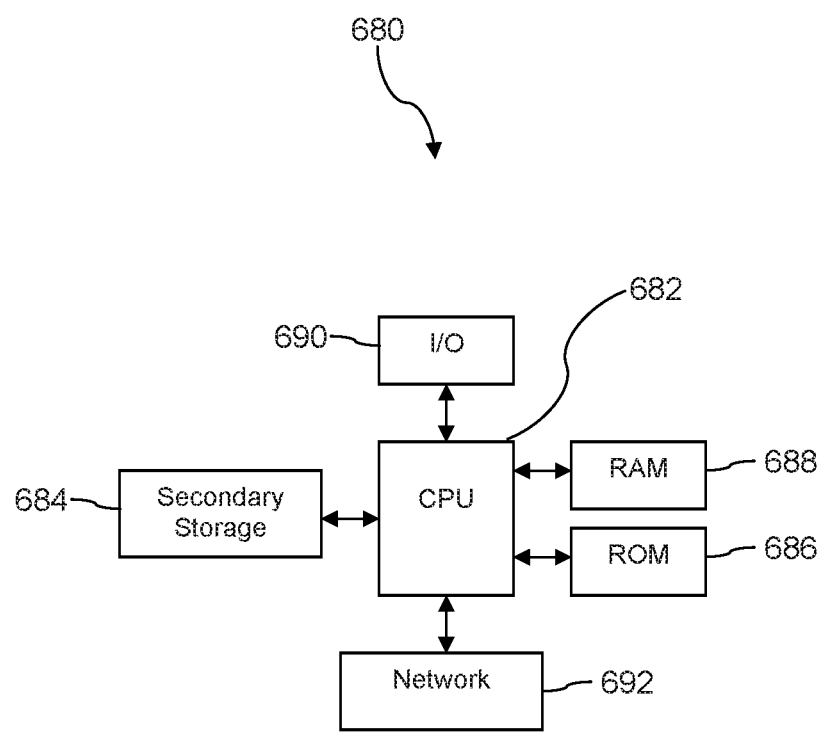

The sine and cosine clock, the sine and cosine clock with the tangent and cotangent functions, and/or the trigonometric summation clock can be implemented on a computer. FIG. 6 illustrates a computer system 680 suitable for implementing one or more embodiments of the display or clocks disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 680 is turned on or booted, the CPU 682 may execute a computer program or application. For example, the CPU 682 may execute software or firmware stored in the ROM 686 or stored in the RAM 688. In some cases, on boot and/or when the application is initiated, the CPU 682 may copy the application or portions of the application from the secondary storage 684 to the RAM 688 or to memory space within the CPU 682 itself, and the CPU 682 may then execute instructions that the application is comprised of In some cases, the CPU 682 may copy the application or portions of the application from memory accessed via the network connectivity devices 692 or via the I/O devices 690 to the RAM 688 or to memory space within the CPU 682, and the CPU 682 may then execute instructions that the application is comprised of. During execution, an application may load instructions into the CPU 682, for example load some of the instructions of the application into a cache of the CPU 682. In some contexts, an application that is executed may be said to configure the CPU 682 to do something, e.g., to configure the CPU 682 to perform the function or functions promoted by the subject application. When the CPU 682 is configured in this way by the application, the CPU 682 becomes a specific purpose computer or a specific purpose machine.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684. The secondary storage 684, the RAM 688, and/or the ROM 686 may be referred to in some contexts as computer readable storage media and/or non-transitory computer readable media.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 692 may enable the processor 682 to communicate with the Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 682 executes instructions, codes, computer programs, scripts which it accesses from hard disk, floppy disk, optical disk (these various disk based systems may all be considered secondary storage 684), flash drive, ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 684, for example, hard drives, floppy disks, optical disks, and/or other device, the ROM 686, and/or the RAM 688 may be referred to in some contexts as non-transitory instructions and/or non-transitory information.

In some contexts, the secondary storage 684, the ROM 686, and the RAM 688 may be referred to as a non-transitory computer readable medium or a computer readable storage media. A dynamic RAM embodiment of the RAM 688, likewise, may be referred to as a non-transitory computer readable medium in that while the dynamic RAM receives electrical power and is operated in accordance with its design, for example during a period of time during which the computer system 680 is turned on and operational, the dynamic RAM stores information that is written to it. Similarly, the processor 682 may comprise an internal RAM, an internal ROM, a cache memory, and/or other internal non-transitory storage blocks, sections, or components that may be referred to in some contexts as non-transitory computer readable media or computer readable storage media.

Having described various devices and methods, specific embodiments can include, but are not limited to:

In a first embodiment, a trigonometric function display clock comprises: axial markings aligned with an x-axis and a y-axis of a clock face; and a secondary circle having a diameter equal to a radius of the axial markings between a center of each axial marking and an end of each axial marking, wherein a first point on the secondary circle is aligned at the center of each axial marking, wherein the secondary circle is configured to be rotatable about the first point, and wherein the secondary circle is configured to overlap and align with at least a portion of the axial markings as the secondary circle rotates about the first point.

A second embodiment can include the clock of the first embodiment, further comprising: a unit circle disposed on the clock face, wherein a center of the unit circle is aligned with the center of each axial marking, and wherein the center of the unit circle is aligned with a central axis of the clock face.

A third embodiment can include the clock of the first or second embodiment, wherein the secondary circle is disposed within the unit circle, and wherein a second point on the secondary circle aligns with the unit circle.

A fourth embodiment can include the clock of any one of the first to third embodiments, further comprising: at least one hand configured to rotate about the central axis.

A fifth embodiment can include the clock of the fourth embodiment, wherein the secondary circle is coupled to the at least one hand.

A sixth embodiment can include the clock of the fourth or fifth embodiment, wherein the at least one hand comprises an hour hand, a minute hand, and a second hand.

In a seventh embodiment, a trigonometric function display clock comprises: axial openings in a clock face, wherein the axial openings are aligned with an x-axis and a y-axis of the clock face; and a secondary circular disc having a diameter equal to a radius of each axial opening, wherein a first point on the secondary circular disc is aligned at a center of each axial marking, wherein the secondary circular disc is configured to be rotatable about the first point, wherein the secondary circular disc is disposed on a first side of the clock face, and wherein the secondary circular disc is visible through the axial openings from a second side of the clock face.

An eighth embodiment can include the clock of the seventh embodiment, further comprising: a unit circle disposed on the clock face, wherein a center of the unit circle is aligned with a central axis.

A ninth embodiment can include the clock of the seventh or eighth embodiment, further comprising: a background disc disposed on the second side of the clock face, wherein the secondary circular disc is disposed on the background disc.

A tenth embodiment can include the clock of any one of the seventh to ninth embodiments, further comprising: at least one hand configured to rotate about the central axis, wherein the at least one hand is disposed on the second side of the clock face.

An eleventh embodiment can include the clock of the tenth embodiment, wherein the secondary circular disc is coupled to the at least one hand.

A twelfth embodiment can include the clock of the tenth or eleventh embodiment, wherein the at least one hand comprises an hour hand, a minute hand, or a second hand.

A thirteenth embodiment can include the clock of any one of the seventh to twelfth embodiments, wherein a second point on a perimeter of the secondary circular disc aligns with the unit circle.

A fourteenth embodiment can include the clock of any one of the tenth to thirteenth embodiments, wherein the at least one hand is disposed on the first side of the clock face.

In a fifteenth embodiment, a method of displaying one or more trigonometric functions comprises: providing a display device comprising: a unit circle disposed on a clock face, wherein a center of the unit circle is aligned with a central axis; axial markings aligned with an x-axis and a y-axis; and a secondary circle having a diameter equal to a radius of the unit circle, wherein a first point on the secondary circle is aligned at the center of the unit circle, and wherein a second point on a perimeter of the secondary circle aligns with the unit circle; rotating the secondary circle about the first point, wherein the secondary circle intersects with at least a portion of the axial markings as the secondary circle rotates about the first point; and determining at least one of a value of a sine function or a value of a cosine function at the second point based on the overlap between the secondary circle and the axial markings.

A sixteenth embodiment can include the method of the fifteenth embodiment, wherein determining the at least one of the value of the sine function or the cosine function at the second point comprises: determining a value of the cosine function at the second point, wherein the value of the cosine function corresponds to a proportional length of: 1) a first length of the axial marking between the central axis and an intersection between the secondary circle and the axial marking on the x-axis, and 2) a total length between the central axis and the unit circle along the axial marking on the x-axis.

A seventeenth embodiment can include the method of the fifteenth embodiment, wherein determining the at least one of the value of the sine function or the cosine function at the second point comprises: determining a value of the sine function at the second point, wherein the value of the sine function corresponds to a proportional length of: 1) a first length of the axial marking between the central axis and an intersection between the secondary circle and the axial marking on the y-axis, and 2) a total length between the central axis and the unit circle along the axial marking on the y-axis.

An eighteenth embodiment can include the method of the fifteenth embodiment, wherein the axial markings comprise openings in the clock face, wherein the secondary circle comprises a perimeter of a secondary circular disc, and wherein the secondary circular disc, wherein the secondary circular disc disposed on a first side of the clock face, and wherein the secondary circular disc is visible through the openings from a second side of the clock face.

A nineteenth embodiment can include the method of the eighteenth embodiment, wherein determining the at least one of the value of the sine function or the cosine function at the second point comprises: determining a value of the cosine function at the second point, wherein the value of the cosine function corresponds to a proportional length of: 1) a first length of the secondary circular disc between the central axis and the unit circle visible through the opening on the x-axis, and 2) a total length between the central axis and the unit circle along the opening on the x-axis.

A twentieth embodiment can include the method of the eighteenth embodiment, wherein determining the at least one of the value of the sine function or the cosine function at the second point comprises: determining a value of the sine function at the second point, wherein the value of the sine function corresponds to a proportional length of: 1) a first length of the secondary circular disc between the central axis and the unit circle visible through the opening on the y-axis, and 2) a total length between the central axis and the unit circle along the opening on the y-axis.

A twenty first embodiment can include the method of any one of the fifteenth to twentieth embodiments, wherein the display device further comprises: at least one hand configured to rotate about the central axis, wherein the at least one hand comprises an hour hand, a minute hand, and a second hand.

A twenty second embodiment can include the method of the twenty first embodiment, wherein the secondary circle is coupled to the at least one hand.

A twenty third embodiment can include the method of the twenty first or twenty second embodiment, further comprising: determining a time using the at least one hand on the display device.

A twenty fourth embodiment can include the method of any one of the fifteenth to twenty third embodiments, wherein the display device further comprises an enclosing square displayed around the unit circle, wherein the method further comprises: determining at least one of a tangent value or a cotangent value at the second point using the enclosing square.

In a twenty fifth embodiment, a trigonometric function display clock method comprises: executing a clock application on a processor, wherein the clock application is stored in a memory, generating, by the clock application, a clock display having at least one hand indicator, wherein the at least one hand indicator rotates about a central axis; generating, by the clock application, at least one of a cosine indicator or a sine indicator on the clock display, wherein the at least one of the cosine indicator or the sine indicator is indicative of a value of a cosine or sine, respectively, of a position of the at least one hand indicator.

A twenty sixth embodiment can include the method of the twenty fifth embodiment, further comprising: generating and displaying a unit circle indicator on the clock display, wherein a center of the unit circle indicator is aligned with the central axis.

A twenty seventh embodiment can include the method of the twenty fifth or twenty sixth embodiment, further comprising: generating and displaying, by the clock application, axial markings aligned with an x-axis and a y-axis.

A twenty eighth embodiment can include the method of any one of the twenty sixth to twenty seventy embodiments, further comprising: generating and displaying, by the clock application, a secondary circle having a diameter equal to a radius of the unit circle, wherein a first point on the secondary circle is aligned at the center of the unit circle, wherein the secondary circle is configured to be rotatable about the first point, and wherein the secondary circle is configured to overlap and align with at least a portion of the axial markings as the secondary circle rotates about the first point.

A twenty ninth embodiment can include the method of any one of the twenty sixth to twenty eighth embodiments, further comprising: generating and displaying, by the clock application, one or more arc indicators, wherein the one or more arc indicators are indicative of a rotational distance of the at least one hand indicator from an origin point.

A thirtieth embodiment can include the method of any one of the twenty fifth to twenty ninth embodiments, wherein the at least one hand indicator comprises a plurality of hand indicators, and wherein at least two hand indicators of the plurality of hand indicators are displayed in different colors.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A trigonometric function display clock, the clock comprising:
    axial markings aligned with an x-axis and a y-axis of a clock face; and
    a secondary circle having a diameter equal to a radius of the axial markings between a center of each axial marking and an end of each axial marking; and at least one hand configured to rotate about the central axis, wherein the secondary circle is coupled to the at least one hand,
    wherein a first point on the secondary circle is aligned at the center of each axial marking,
    wherein the secondary circle is configured to be rotatable about the first point, and
    wherein the secondary circle is configured to overlap and align with at least a portion of the axial markings as the secondary circle rotates about the first point.

2. The clock of claim 1, further comprising:
    a unit circle disposed on the clock face, wherein a center of the unit circle is aligned with the center of each axial marking, and wherein the center of the unit circle is aligned with a central axis of the clock face.

3. The clock of claim 1, wherein the secondary circle is disposed within the unit circle, and wherein a second point on the secondary circle aligns with the unit circle.

4. The clock of claim 1, wherein the at least one hand comprises an hour hand, a minute hand, and a second hand.

5. A trigonometric function display clock, the clock comprising:
    axial openings in a clock face, wherein the axial openings are aligned with an x-axis and a y-axis of the clock face;
    a secondary circular disc having a diameter equal to a radius of each axial opening; and at least one hand configured to rotate about the central axis, wherein the at least one hand is disposed on the second side of the clock face, wherein the secondary circle is coupled to the at least one hand,
    wherein a first point on the secondary circular disc is aligned at a center of each axial marking,
    wherein the secondary circular disc is configured to be rotatable about the first point,
    wherein the secondary circular disc is disposed on a first side of the clock face, and
    wherein at least a portion of the secondary circular disc is visible through the axial openings from a second side of the clock face.

6. The clock of claim 5, further comprising:
    a unit circle disposed on the clock face, wherein a center of the unit circle is aligned with a central axis.

7. The clock of claim 5, further comprising:
    a background disc disposed on the first side of the clock face, wherein the secondary circular disc is disposed on the background disc.

8. The clock of claim 5, wherein the at least one hand comprises an hour hand, a minute hand, or a second hand.

9. The clock of claim 5, wherein a second point on a perimeter of the secondary circular disc aligns with the unit circle.

10. A method of displaying one or more trigonometric functions, the method comprising:
    providing a display device comprising:
        a unit circle disposed on a clock face, wherein a center of the unit circle is aligned with a central axis;
        axial markings aligned with an x-axis and a y-axis;
        a secondary circle having a diameter equal to a radius of the unit circle; and at least one hand configured to rotate about the central axis, wherein the at least one hand comprises an hour hand, a minute hand, and a second hand, wherein the secondary circle is coupled to the at least one hand,
    wherein a first point on the secondary circle is aligned at the center of the unit circle, and wherein a second point on a perimeter of the secondary circle aligns with the unit circle;

rotating the secondary circle about the first point, wherein the secondary circle intersects with at least a portion of the axial markings as the secondary circle rotates about the first point; and determining at least one of a value of a sine function or a value of a cosine function at the second point based on the overlap between the secondary circle and the axial markings.

11. The method of claim 10, wherein determining the at least one of the value of the sine function or the cosine function at the second point comprises:

determining a value of the cosine function at the second point, wherein the value of the cosine function corresponds to a proportional length of: 1) a first length of the axial marking between the central axis and an intersection between the secondary circle and the axial marking on the x-axis, and 2) a total length between the central axis and the unit circle along the axial marking on the x-axis.

12. The method of claim 10, wherein determining the at least one of the value of the sine function or the cosine function at the second point comprises:

determining a value of the sine function at the second point, wherein the value of the sine function corresponds to a proportional length of: 1) a first length of the axial marking between the central axis and an intersection between the secondary circle and the axial marking on the y-axis, and 2) a total length between the central axis and the unit circle along the axial marking on the y-axis.

13. The method of claim 10, wherein the axial markings comprise openings in the clock face, wherein the secondary circle comprises a perimeter of a secondary circular disc, and wherein the secondary circular disc disposed on a first side of the clock face, and wherein the secondary circular disc is visible through the openings from a second side of the clock face.

14. The method of claim 13, wherein determining the at least one of the value of the sine function or the cosine function at the second point comprises:

determining a value of the cosine function at the second point, wherein the value of the cosine function corresponds to a proportional length of: 1) a first length of the secondary circular disc between the central axis and the unit circle visible through the opening on the x-axis, and 2) a total length between the central axis and the unit circle along the opening on the x-axis.

15. The method of claim 13, wherein determining the at least one of the value of the sine function or the cosine function at the second point comprises:

determining a value of the sine function at the second point, wherein the value of the sine function corresponds to a proportional length of: 1) a first length of the secondary circular disc between the central axis and the unit circle visible through the opening on the y-axis, and 2) a total length between the central axis and the unit circle along the opening on the y-axis.

16. The method of claim 10, further comprising:

determining a time using the at least one hand on the display device.

17. The method of claim 10, wherein the display device further comprises an enclosing square displayed around the unit circle, wherein the method further comprises:

determining at least one of a tangent value or a cotangent value at the second point using the enclosing square.

18. The method of claim 10, wherein the display device further comprises:

at least one hand is configured to rotate about the central axis, wherein the at least one hand comprises a minute hand, wherein the secondary circle is coupled to the minute hand, wherein an hour hand is disposed on an opposite side of the clock face from the minute hand, and wherein the hour hand is visible through at least a portion of the clock face.

* * * * *